3,425,189
DIFFUSER-LIKE INLET CONNECTION FOR ELECTRICAL DUST SEPARATORS
Karl Haselmayer, Dornigheim am Main, Germany, assignor to Metallgesellschaft Aktiengesellschaft, Frankfurt am Main, Germany, a corporation of Germany
Filed Aug. 27, 1965, Ser. No. 483,163
U.S. Cl. 55—129          2 Claims
Int. Cl. B03c 3/02

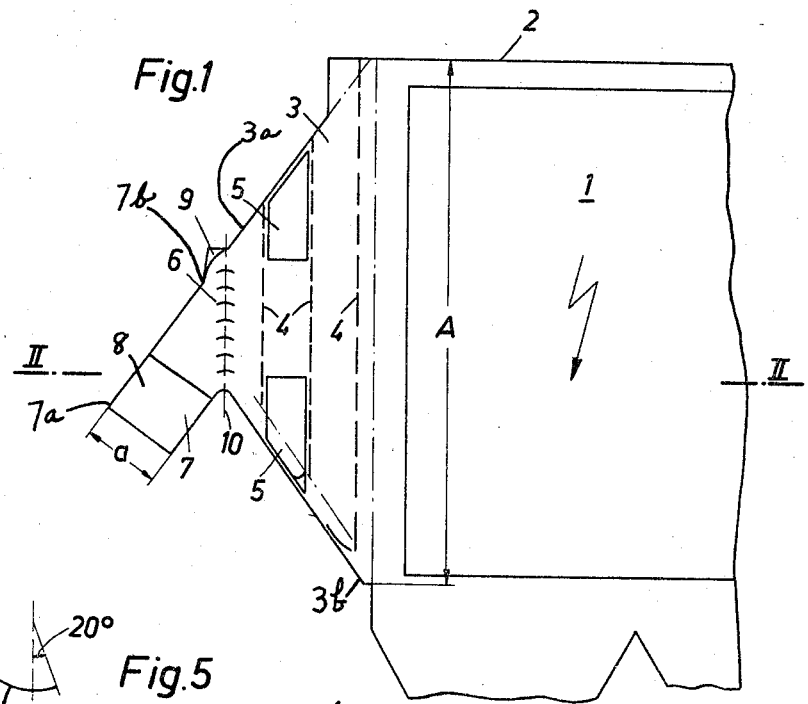
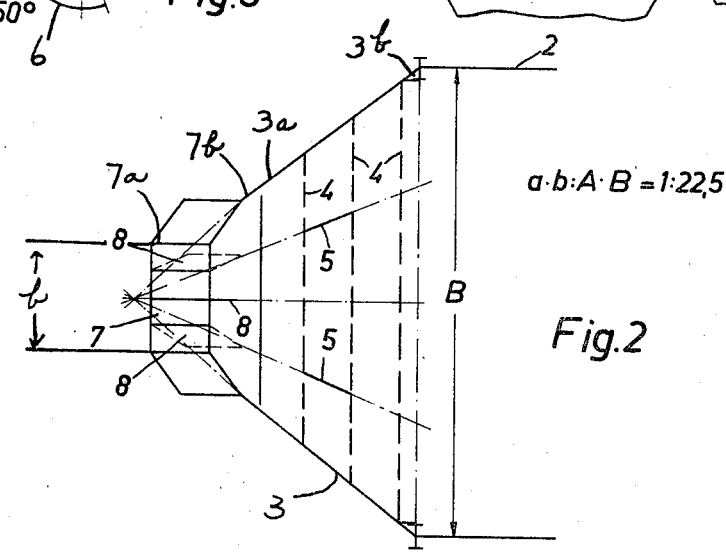

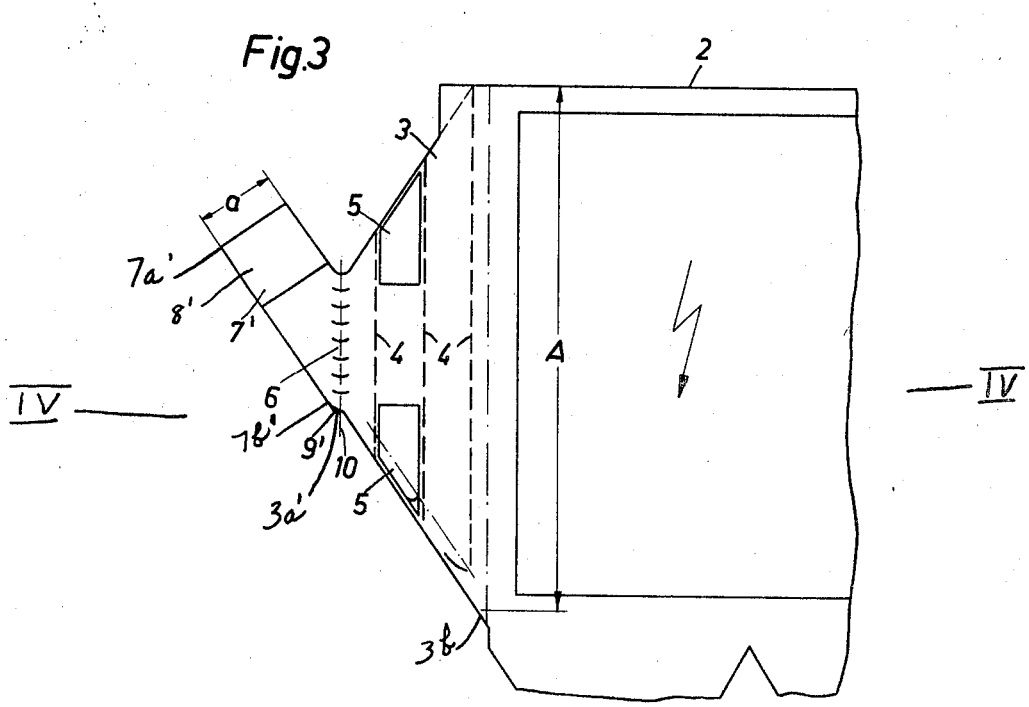
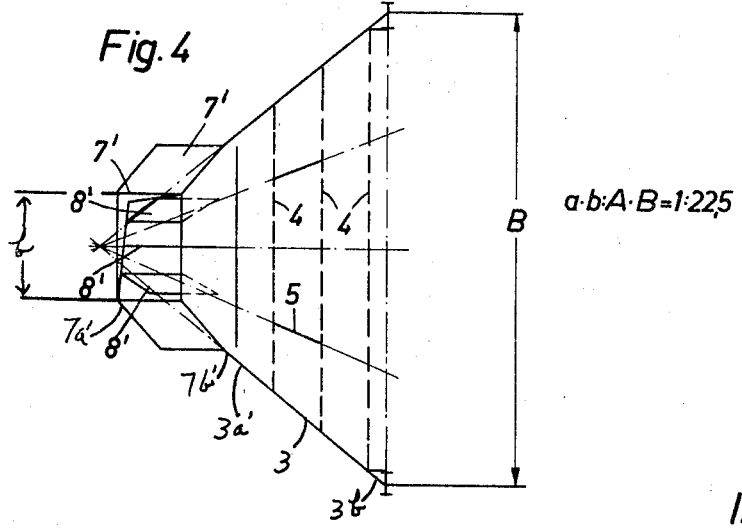
$a \cdot b : A \cdot B = 1 : 22{,}5$
Inventor:
KARL HASELMAYER

ABSTRACT OF THE DISCLOSURE

Electrostatic dust separator with gas conveying inlet connection in the form of a horizontal axis quadrilateral truncated pyramid-shaped diffuser diverging toward the separator and containing perforated plates to distribute uniformly incoming gas, an angular throat inclined upwardly toward the diffuser and having a longitudinal axis intersecting the diffuser horizontal axis at an angle of about 45–60°, said throat diverging toward said diffuser at an aperture angle of about 60 to 90° and containing flow directing plates to distribute gas flow uniformly, a connecting juncture having a profile surface in the form of a concave through flow connecting the throat with the diffuser, and gas deflecting grid means disposed across the flow cross section of the diffuser at the connecting juncture to deflect incoming gas from the throat to the diffuser uniformly and without premature dust separation thereat, the over-all cross-sectional aperture ratio from the inlet side of the throat to the outlet side of the diffuser being e.g. between about 1:10–25.

---

The present invention relates to a diffuser-like inlet connection for electrical dust separators, and more particularly to an improvement in an arrangement of the foregoing type in which an angular throat or passageway having a longitudinal axis at an angle with respect to the longitudinal axis of the diffuser is provided, such that the outlet side of the throat flow communicates with the inlet side of the diffuser, whereupon fluid, such as a gas containing dust to be removed, may be deflected from the angular path of the throat into the longitudinal path of the diffuser, and in turn caused to flow uniformly from the diffuser into the electrical dust separator chamber.

Generally, the gas velocities required in the dust removal art, as for example in connection with the use of electrical dust separators or electrostatic precipitators, are between about 0.5 and 3 meters per second, and are preferably about 1 meter per second. On the other hand, the gas velocities required for the prevention of dust accumulation in feed passages, such as those leading to electrical dust separator chambers or electrostatic precipitators, are about 10 and 30 meters per second. Since the maximum required velocities in the feed ducts in question do not coincide usually with the minimum values of the gas velocities contemplated in electrical dust removers or separators in actual practice, a compromise is sought wherein over-all aperture ratios between 1:10 and 1:25 are required over the entire range of applications, i.e. with respect to dust removal and flow of gases containing dust with a minimum of premature dust accumulation, in the transition from the relatively small feed duct cross sections to the dust removal cross sections.

If a raw gas which is to be cleaned is conducted from the raw gas duct, for example, into an electrical dust separator or electrostatic precipitator, difficulty develops in guiding the gas flow to the abrupt enlargement of the cross section along the flow path to the separator or precipitator. An electrical dust separator, under good electrical conditions will always produce an optimum degree of separation when the gas to be cleaned can be distributed uniformly over the entire flow path cross section, with the lowest possible velocity in the individual portions of such cross section.

The aforementioned over-all aperture ratios can be utilized in practice, for instance by interposing a diffuser between the raw gas duct and the dust remover inlet leading to the separator or precipitator. However, the greater the ratio between the diffuser input flow cross section and output flow cross section, and the greater the over-all aperture angle of the diffuser i.e. angle of divergence from input to output, the more difficult will be the maintenance of a uniform velocity distribution of the fluid or gas at the output of the diffuser, i.e. at the input of the electrical dust separator, if a uniform distribution at the input of such separator is still to be maintained.

In order to utilize a slender or narrow diffuser, i.e. one having a small aperture angle from input to output, a bunker or free space below the diffuser is required in order to prevent dust accumulation along the flow path. Such constructions utilize a so-called forebunker, but this provision is undesirable in most cases due to the greater amount of space required to accommodate the same and the increased expense for providing such a diffuser in connection with dust evacuating or removing apparatus.

If the diffuser in question is to be constructed without the provision of a forebunker, it is necessary in such instance to provide the total aperture angle in the vertical such that the same will amount at least to 110°, if dust accumulations along the flow path are to be avoided.

Under these conditions, the diffuser becomes very short in flow length and the maintenance of a uniform velocity distribution therealong becomes extremely difficult. Accordingly, it has not been possible up to the present to achieve useable velocity distributions in the case of diffuser aperture ratios greater than 1:7.5.

In connection with the usual dust separator operations, over-all ratios of aperture between 1:10 and 1:25 are required as aforesaid, and therefore it is necessary in order to maintain such desirable ratios in practice, to provide wider cross sectional apertures at the output side of the diffuser which flow communicates with the electrical dust separator chamber or electrostatic precipitator chamber per se. The desired over-all ratios noted may be achieved by utilizing a construction containing a 90° louver or lattice deflecting apparatus with conventional variable aperture ratios of 1:1 to 1:3 in this portion of the flow, i.e. prior to entry of the gas into the precipitator or separator. However, such a 90° flow deflecting device can be used for an input only when the flow enters from below, since when it is used with an input which enters from above, dust accumulations occur in back of the louver or lattice deflector as a consequence of the excessively low velocity of the gas in this portion of the flow path. The dust accumulations occurring in this regard where the input enters from above would result in practice in the considerable impairment of the gas distribution within the dust separator arrangement utilized.

In this regard, constructional arrangements are known in which 90° gas deflections are performed by means of deflecting louvers, perforated plates, radial plates and the like, such as where the gas flows in from below. In the case of angular deflections of 90° utilizing a gas flow entering from above, these arrangements are not useable in practice, due to the fact that the abrupt turn in the flow path produces areas of poor flow which can gradually lead to the clogging of the flow cross section of the particular passage.

It has further developed that, in the case of 90° flows of the aforementioned type, if the 90° angle is in fact divided into two angles of 45° each in a staggered manner along the flow path, for instance, the aforementioned disadvantage of poor flow coupled with clogging will be avoided. Nevertheless, in such a system nothing approaching a uniform delivery to the electrostatic dust separator has actually been experienced in practice.

In the case of 90° louver or lattice type deflecting devices where the flow input enters from above, it is therefore necessary to avoid the provision for a horizontal section in the deflecting device after the deflection of flow has been completed, but of course this will limit the space accommodation, the versatility in design, and the economical aspects of a particular dust separator installment.

It is an object of the present invention to overcome the foregoing disadvantages and to provide a diffuser-like inlet connection for electrical dust separators or electrostatic precipitators which includes in addition to the usual diverging diffuser communicating with the electrostatic precipitator per se, an angular throat having an aperture angle of substantially between about 60 to 90° and a longitudinal axis at an angle of substantially between about 45 to 60° with respect to the longitudinal axis of the diffuser, such diffuser axis preferably being horizontal, whereby the fluid such as a gas containing dust particles to be separated may be deflected from above or from below into the diffuser and uniformly conducted therealong for passage at optimum flow velocity with minimum turbulence into and through the electrostatic precipitator or electrical dust separator.

It is a further object of the present invention to provide a construction having minimum cost, prolonged durability in use, versatility in design, freedom from significant dust accumulations along the flow paths and occlusion in such flow paths, and to provide optimum uniform delivery of fluid to the electrostatic dust separator for achieving maximum effective dust separation therein.

Other and further objects of the present invention will become apparent from a study of the within specification and accompanying drawings in which:

FIG. 1 is a schematic side sectional view of the inlet connection construction for an electrical dust separator or electrostatic precipitator utilized in accordance with one embodiment of the present invention in which the raw gas input enters from below, FIG. 2 is a top schematic view in section, taken along the line II—II of FIG. 1, FIGS. 3 and 4 are schematic views similar respectively to those of FIGS. 1 and 2, representing an alternate embodiment of the present invention in which the raw gas input enters from above, the appropriate flow cross sectional areas at the input and output portions of the apparatus shown, in both instances, being equivalent for purposes of illustration, especially as regards the ratios of aperture, and FIG. 5 is an enlarged schematic side view of a slat of the louvered deflecting device utilized in the diffuser portion of the apparatus of FIGS. 1 to 4 illustrating the curved over trailing edge with respect to the vertical, considering that a multiplicity of such slats is provided in superimposed spaced-apart relation with respect to one another.

It has been found in accordance with the present invention that an efficient improvement may now be provided in an arrangement having a fluid conveying inlet connection in the form of a diffuser for an electrostatic dust separator, in which said diffuser has a flow path that diverges longitudinally from a smaller flow cross section at the inlet side thereof to a larger flow cross section at the outlet side thereof for flow communication thereat with such dust separator, in which said diffuser is provided in the diverging flow path thereof with means for uniform fluid distribution therealong for conveying such fluid uniformly into such dust separator for dust separation therein, in which the incoming fluid introduced into the inlet side of said diffuser is deflected thereinto at an angle of about 45 to 60° with respect to the longitudinal axis of said diffuser, and in which the over-all cross sectional aperture ratio from the initial fluid introduction into the arrangement to the outlet side of said diffuser is substantially between about 1:10–25, such improvement contemplating the provision for an angular throat in flow communication with the inlet side of such diffuser having an aperture angle of substantially between about 60 to 90° and a longitudinal axis positioned at an angle of substantially between about 45 to 60° with respect to the longitudinal axis of such diffuser for introducing such fluid for deflection into the diffuser.

Preferably the angular throat or passageway has an inlet side remote from the diffuser and an outlet side adjacent the inlet side of the diffuser, such that the throat is flow connected with the diffuser by means of a connecting juncture, such as one typically extending coaxially with the adjacent inlet side of the diffuser and having a relatively narrow axial width to accomplish the juncture between the outlet side of the throat and the inlet side of the diffuser with optimum flow transition from the throat to the diffuser, considering the angular deflection of the fluid flow thereat. Such connecting juncture is constructed in the preferred embodiment of the present invention in a manner that the profile surface thereof in the transition from the outlet side of the throat to the inlet side of the diffuser assumes the form of a concave trough.

Advantageously, the angular throat or passageway is provided with a plurality of laterally spaced-apart flow directing plates situated in the longitudinal flow direction of the fluid whereby to distribute uniformly the incoming fluid which is to be deflected into the diffuser.

In accordance with a preferred embodiment of the present invention, the angle of aperture of the throat is about 60° and the cross sectional aperture ratio from the inlet side of the throat to the outlet side thereof is substantially between about 1:1–3.

The throat is suitably removably positioned, in accordance with the preferred construction of the invention, at the inlet side of the diffuser. Moreover, in a particularly useful practical embodiment of the invention, three laterally spaced-apart flow directing plates are provided in the throat.

A particularly useful and convenient form of construction of the diffuser is such that the longitudinal axis thereof is horizontal. Such diffuser preferably assumes the shape of a quadrilateral truncated pyramid having perforated plate means and fluid deflecting grid means situated therein at spaced-apart axial points and extending across the flow cross section of the diffuser for achieving the uniform fluid distribution therein.

Of course, the angle of the longitudinal axis of the throat with respect to the longitudinal axis of the diffuser may be such that the fluid flow from the throat is deflected into the diffuser either from above or from below.

The grid means is disposed preferably in a vertical manner across the flow cross section of the diffuser, and the same is true of the perforated plate means. The grid means will typically include a plurality of vertically spaced-apart superimposed transversely extending horizontal slats having arcuate cross sections with the trailing edges remote from the throat in the flow direction curving substantially between about 10 and 30°, preferably 10 to 20°, beyond the central or vertical axis of the grid.

In accordance with a particular embodiment of the present invention, an improvement may be provided in an arrangement having a gas conveying inlet connection in the form of a quadrilateral truncated pyramid shaped diffuser for an electrostatic dust separator, in which said diffuser has a flow path that diverges longitudinally along a horizontal axis from a smaller flow cross section at the inlet side thereof to a larger flow cross section at the outlet side thereof for gas communication thereat with such dust separator, in which said diffuser is provided in the diverging flow path thereof with perforated plate means and gas deflecting grid means at spaced-apart axial points vertically across the flow cross section of the diffuser for uniform gas distribution therealong for conveying such gas uniformly into such dust separator for dust separation therein, in which the incoming gas introduced into the inlet side of said diffuser is deflected thereinto at an angle of about 45 to 60° with respect to the longitudinal horizontal axis of said diffuser, and in which the over-all cross sectional aperture ratio from the initial gas introduction into the arrangement to the outlet side of said diffuser is substantially between about 1:10–25, such improvement relating to the provision for a removable angular throat in direct flow communication with the inlet side of such diffuser, the throat having an inlet side remote from the diffuser and an outlet side adjacent the diffuser and an aperture angle of substantially between about 60 to 90° as well as a longitudinal axis positioned at an angle of substantially between about 45 to 60° with respect to the longitudinal horizontal axis of said diffuser, for introducing such gas for deflection into said diffuser, said throat having a plurality of laterally spaced apart flow directing plates situated in the longitudinal flow direction of the gas to distribute uniformly the incoming gas to be deflected into the diffuser, and the cross sectional aperture ratio from the inlet side to the outlet side of said throat being substantially between about 1:1–3.

Referring to the drawings, FIG. 1 shows an arrangement including an electrostatic separating field 1 enclosed in a housing 2 of an electrostatic dust separator which is provided with a diffuser-like inlet connection or diffuser 3 containing axially spaced-apart perforated plates 4 which extend vertically across the flow path of the diffuser 3 and also containing radial plates 5 which are situated more or less peripherally, yet extending in appropriate radial planes. Guiding slats 6 are mounted in vertically spaced-apart superimposed relation at the entry of the diffuser 3 along the vertical axis 10, the leading edges of the slats being immediately adjacent the adjoining angular throat or passageway 7 which is provided with an aperture angle of about 60° and a longitudinal axis situated at an angle of about 60° with respect to the horizontal axis of the diffuser 3. The throat is similarly provided with directing plates 8 extending more or less longitudinally as regards the flow path, and the over-all arrangement is such that the raw or crude fluid, such as a gas, which is to be treated for removal of dust or the like, enters the angular throat at inlet 7a, thence passes upwardly to the outlet 7b which is flow connected to the inlet 3a of diffuser 3 by means of the connecting juncture 9 just before the guiding slats 6 in the forward flow direction, such that the fluid flow will be deflected at the slats 6 from the upwardly directed angular path of the throat into the diffuser whereby to assume a uniform flow of decreased velocity, yet with a minimum of turbulence. In this manner, the fluid flow passing longitudinally through the diffuser 3 is discharged therefrom at diffuser outlet 3b so that the same will enter housing 2 for treatment by the electrostatic separating field 1 to achieve maximum dust removal therein.

While the deflecting slats have been omitted from FIG. 2 for ease in illustrating the constructional features therein disclosed, it will be seen that the raw gas entering from below passes angularly upwardly in a controlled manner by reason of the plates 8, is then deflected by the guiding slats 6 into the diffuser 3 and therein expanded along the flow path which diverges from inlet 3a to outlet 3b while being controlled uniformly by the radial plates 5 and the perforated plates 4.

In the embodiment shown in FIGS. 1 and 2 the diffuser 3 assumes the form of a quadrilateral truncated pyramid, and the throat or passageway 7 assumes the form of a comparatively narrower conduit which effects the transition from angular to horizontal flow in efficient manner such that dust accumulations do not occur at any point along the constantly diverging flow path leading to the electrostatic precipitating housing 2.

It will be realized that to maintain optimum flow conditions with respect to uniformity, freedom from turbulence and avoidance of dust accumulations prior to entry of the crude fluid into housing 2, the horizontal connecting juncture 9 is utilized in a form providing the profile surface in the transition area between the outlet side 7b of the throat 7 and the inlet side 3a of the diffuser 3, as a concave trough rather than as an angular section.

With respect to FIGS. 3 and 4, a similar embodiment to that of FIGS. 1 and 2 is shown and like parts are assigned like reference numerals. In this embodiment, the only essential difference from that of FIGS. 1 and 2 is that the incoming raw material, such as a gas containing dust to be separated, enters from above at the inlet side 7a' of the angular throat 7', thence passes in the transition area from the outlet side 7b' of the throat through the connecting juncture 9' whereupon the angularly downwardly flowing gas is deflected by the slats 6 along the vertical axis 10 past the inlet 3a' of the diffuser 3 so that the gas similarly passes through diffuser 3 in a uniform manner and with a minimum of turbulence and dust accumulations. The connecting junction 9' in the same way as in FIGS. 1 and 2 possesses a concave trough profile to achieve the smooth transition of flow from the downwardly extending angular path of throat 7' to the horizontal flow direction utilized more or less in diffuser 3.

FIG. 5 illustrates permissible angles and curvatures for a louver slat 6 such as that shown in the embodiment of FIG. 3. Of course such slat may be used in connection with the embodiment of FIG. 1 upon inverting the curvature cross sectional configuration.

It will be seen that in accordance with the present invention a bunker substructure or free space below the diffuser section and/or at any point between the inlet to the system and the actual separator chamber is completely absent, yet dust accumulations will be avoided while optimum uniform flow distribution of the incoming fluid such as a gas may be enjoyed. While the velocity of the incoming fluid entering the throat is comparatively higher than that in the diffuser, of course, due to the difference in flow cross section involved, just this difference affords the implementation of decreasing the flow velocity once the fluid reaches the diffuser, but the change in pressure conditions in those portions of the feed flow path leading to the electrostatic precipitator in contemplation of the particular construction of the present invention will not be such that occlusion of the feed flow path will occur even after prolonged periods of use of the system. This will be true regardless of whether the embodiment of FIGS. 1 and 2 or the embodiment of FIGS. 3 and 4 is utilized, i.e. one in which the incoming gas enters from above or from below at any entry angle of approximately about 45 to 60°.

It will be realized that the flow cross sections represented by the product of the dimension a and b on the one hand and A and B on the other hand will provide an overall aperture ratio within the contemplation of practical usefulness in the art of dust entrained fluid flow and electrostatic dust separation. The over-all aperture ratio will be the product of the aperture ratios arranged in series and in accordance with the instant construction versatility in design will be permitted depending upon the dimensions for the system utilized, yet the entire useful range may be enjoyed in accordance with the present invention.

It will be appreciated that the angle of entry of the throat 7 with respect to the horizontal disposition of the diffuser 3 will always be approximaely 45 to 60° although such angle preferably is about 60°, and in this same connection the aperture angle of the throat will be approximately 60 to 90°, though such aperture angle preferably will be about 60° as well.

As for the arcuate slats, these will generally possess a trailing arcuate portion having an angle of 10 to 30°, and preferably 20°, curvature, i.e. in the discharge portion, whether the slats are such that in cross section they contain a convex or concave configuration as seen from above.

All in all, in accordance with the construction of the present invention, it is now possible without great expense to achieve the required aperture ratios for fluid feed and for electrostatic dust precipitation such that a uniform gas distribution into the electrical dust separator occurs for the more efficient separation of dust from a fluid such as gas in the separator.

As may be seen from FIGS. 1 to 4, assuming constant values in each embodiment for the dimension $a$, $b$, $A$, and $B$, an over-all aperture ratio from inlet $7a$ of throat 7 to outlet $3b$ of diffuser 3 may be arrived at for example by the relation $a \cdot b : A \cdot B = 1:22.5$. This will provide a distinct embodiment illustrating the over-all cross sectional aperture ratio useful in achieving uniform flow velocity throughout the flow path in question optimumly situated within the desired range which will prevent dust accumulation prior to entry of the gas into the electrostatic precipitator and maximum dust separation once the gas in uniform flow reaches the electrostatic precipitator.

What is claimed is:

1. Arrangement comprising an electrostatic dust separator with a gas conveying inlet connection in the form of a quadrilateral truncated pyramid-shaped diffuser having a flow path which diverges longitudinally along a horizontal axis from the inlet side thereof remote from said dust separator to the outlet side thereof adjacent said dust separator, perforated plate means situated at spaced apart axial points vertically across the flow cross section of the diffuser for uniform gas distribution therealong for conveying such gas uniformly into said dust separator, an angular throat having a lower inlet side remote from said diffuser inlet side and an upper outlet side adjacent said diffuser inlet side and an inclined longitudinal axis intersecting the diffuser horizontal axis at a substantially vertical angle of about 45 to 60°, said angular throat diverging from the lower inlet side thereof toward the upper outlet side thereof at an aperture angle of substantially between about 60–90°, a connecting juncture having a profile surface substantially in the form of a concave trough flow connecting said throat with said diffuser so that incoming gas is deflected from said throat into said diffuser thereat, a plurality of laterally spaced apart flow directing plates situated in said throat in the longitudinal flow direction of the gas to distribute uniformly the incoming gas to be deflected into the diffuser, and gas deflecting grid means disposed vertically across the flow cross section of said diffuser at said connecting juncture including a plurality of vertically spaced apart superimposed transversely extending horizontal slats having arcuate cross sections with the corresponding slat edge portions remote from said throat in the flow direction each defining an overcurvature beyond the transverse plane of the central vertical axis of said grid means which is measured by an arc substantially between about 10 to 30° whereby to deflect gas from said throat to said diffuser uniformly and without premature dust separation thereat, the over-all cross-sectional aperture ratio from the inlet side of said throat to the outlet side of the diffuser being substantially between about 1:10–25.

2. Arrangement according to claim 1 wherein the throat aperture angle is about 60°.

References Cited

UNITED STATES PATENTS

| 1,023,521 | 4/1912 | Miller | 55—414 |
| 2,446,879 | 8/1948 | Kennedy. | |
| 2,501,436 | 3/1950 | Cleveland et al. | |
| 2,631,968 | 3/1953 | Peery. | |
| 2,723,842 | 11/1955 | Hall | 55—101 X |
| 2,756,842 | 7/1956 | Chamberlin et al. | 55—126 X |
| 3,185,181 | 5/1965 | Demyan. | |

FOREIGN PATENTS

| 228,915 | 6/1960 | Australia. |
| 1,028,062 | 2/1953 | France. |
| 1,055,710 | 10/1953 | France. |
| 520,710 | 3/1931 | Germany. |
| 561,508 | 10/1932 | Germany. |
| 703,663 | 3/1941 | Germany. |
| 512,224 | 8/1939 | Great Britain. |
| 598,928 | 3/1948 | Great Britain. |
| 771,244 | 3/1957 | Great Britain. |
| 922,730 | 4/1963 | Great Britain. |
| 993,007 | 5/1965 | Great Britain. |
| 255,358 | 10/1927 | Italy. |

HARRY B. THORNTON, *Primary Examiner.*

DENNIS E. TALBERT, JR., *Assistant Examiner.*

U.S. Cl. X.R.

55—418; 98—40; 138—37

UNITED STATES PATENT OFFICE
CERTIFICATE OF CORRECTION

Patent No. 3,425,189                                      February 4, 1969

Karl Haselmayer

It is certified that error appears in the above identified patent and that said Letters Patent are hereby corrected as shown below:

Column 1, line 24, "concave through flow" should read -- concave trough flow --.

Signed and sealed this 31st day of March 1970.

(SEAL)
Attest:

Edward M. Fletcher, Jr.

Attesting Officer

WILLIAM E. SCHUYLER, JR.

Commissioner of Patents